July 11, 1939.  A. MACK ET AL  2,165,562
EMERGENCY LIGHTING KIT
Filed March 8, 1937   2 Sheets-Sheet 2
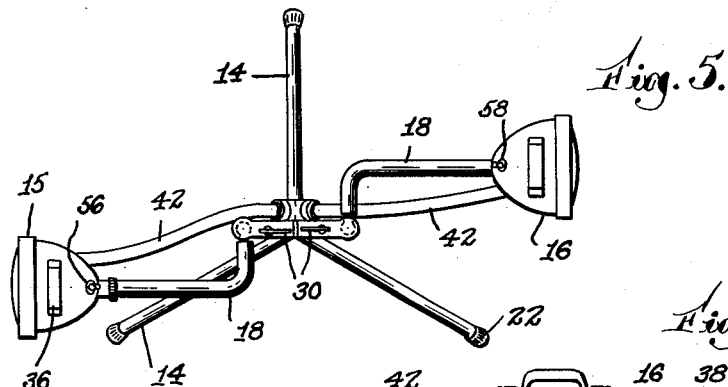
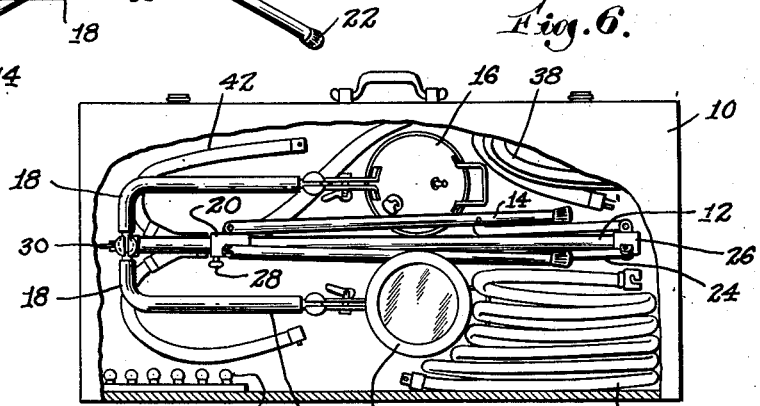
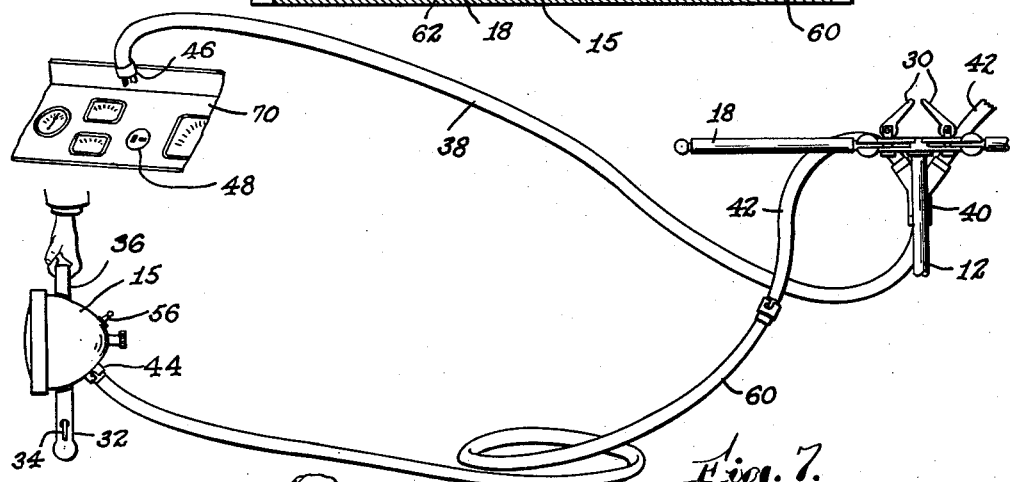
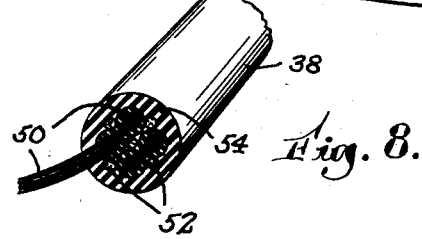
Inventors
ALFRED MACK
MARY W. MACK
by Kenway & Witter
Attorneys Patented July 11, 1939

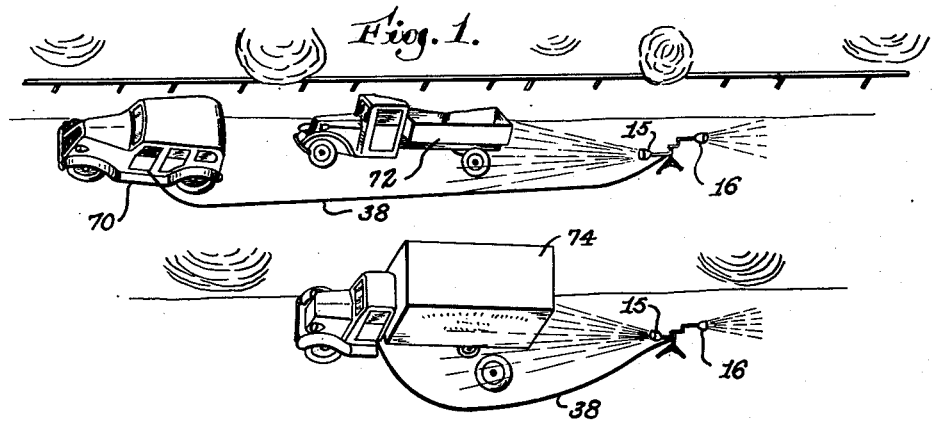
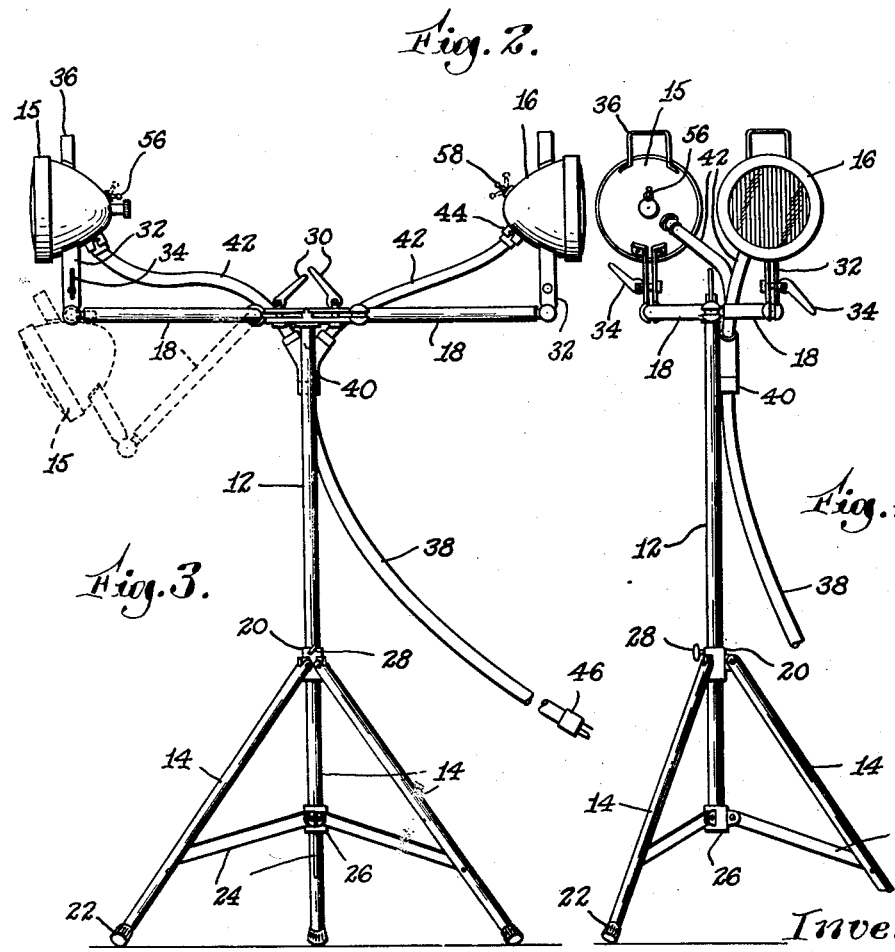

2,165,562

UNITED STATES PATENT OFFICE 2,165,562

EMERGENCY LIGHTING KIT

Alfred Mack and Mary W. Mack, Framingham, Mass.

Application March 8, 1937, Serial No. 129,611

6 Claims. (Cl. 240—8.18)

This invention relates to an emergency lighting kit adapted for use more particularly in connection with motor vehicles. The heavy motor traffic and the resulting accidents and emergencies prevailing throughout this and other countries today is most apparent. It is furthermore a fact that these accidents and emergencies occur more frequently at night when driving conditions are more hazardous. The primary object of our invention is to provide an emergency lighting kit of collapsible form which may be conveniently carried in a motor vehicle and which may be readily and conveniently set up for use in providing light for the emergency and in warning oncoming traffic.

Motor vehicle traffic is today patrolled not only by State and town police but also by State police cars which cruise over the main roads especially during the night hours. When a vehicle accident occurs one of these cars is usually at the scene in short order to give all possible aid and prevent further injury by oncoming traffic. The purpose of our invention is more particularly to provide an emergency lighting kit which will greatly facilitate this work by flood-lighting the scene and warning oncoming traffic, the kit being so inexpensive and operable that one can be carried by each cruising car whereby securing wide distribution thereof and placing the equipment quickly at the scene of each accident. Emergency lighting equipment in present use for this purpose comprises an electric generating truck unit weighing several hundred pounds and so expensive that wide distribution is impossible. As hereinafter more particularly described, our equipment is inexpensive, packs compactly into a convenient packing case, can be set up quickly, and secures its operating power directly from the vehicle battery merely by plugging into a socket provided on each vehicle carrying the kit.

In its preferred form, our invention incorporates a stand having base supporting means and lamp supporting arms, all arranged to be collapsed, together with the lamps, into a compact unit and packed within a convenient carrying case. The lamps include a flood lamp and a warning lamp and the arms are adjustable to dispose the lamps in opposite directions whereby, when the device is set up, one flood lamp lights the scene and the other lamp warns oncoming traffic. The cable wire from the lamps carries a terminal to be plugged into a socket on the kit-carrying vehicle and this wiring is of such large current-carrying capacity that a flood light equivalent to that obtained from a 110 volt current is secured. The kit furthermore includes an extra length of cable which can be placed in the flood lamp lighting circuit to permit use of the lamp at points remote from the stand, the flood lamp being conveniently removable for such purpose. The warning lamp will also preferably be provided with switch control means for giving either steady or intermittent warning.

These and other features of the invention will be best understood and appreciated from the following description of a prefered embodiment thereof selected for purposes of illustration and shown in the accompanying drawings in which, Fig. 1 is a perspective view of an accident scene employing our invention, Fig. 2 is a like view of a motor van employing our invention, Fig. 3 is a side elevation of a device embodying our invention, the device being set up for use, Fig. 4 is an end elevation thereof, Fig. 5 is a plan view thereof, Fig. 6 illustrates the device in collapsed form and packed within a carrying case, Fig. 7 is a fragmentary view illustrating further use of the device, Fig. 8 is a sectional view through the cable wiring.

An embodiment of our novel emergency lighting kit is illustrated in Fig. 6 in collapsed form and packed compactly within a carrying case 10, the case being of a size similar to that of an ordinary suitcase and adapted to be conveniently carried as luggage within a motor vehicle. When emergency arises, the device can be removed from its case and quickly set up to the position shown in Figs. 3 and 4. The device illustrated comprises a stand having a centrally disposed post 12, three collapsible legs 14, two lights 15 and 16 and two light supporting arms 18. The legs are pivoted to a collar 20 slidable on the post 12 and each carries a rubber supporting knob 22 on its free end. A link 24 pivotally connects each leg with a collar 26 fixed to the bottom end of the post. Tightening of a set screw 28 is adapted to affix the collar 20 against movement along the post. Upon loosening this screw, the legs can be collapsed into position along and adjacent to the post as illustrated in Fig. 6.

The arms 18 are preferably identical, each being L-shaped and carrying a ball on each of its two ends. The two arms are mounted on the top end of the stand through the use of sockets for engaging the arm balls, the sockets being clamped onto the balls by hand levers 30. The arms are mounted to project outwardly in opposite directions from the stand (Fig. 5) whereby locating the arms on opposite sides of the stand. Each lamp carries a socket member 32 which may be clamped onto the ball of its arm by means of a clamping lever 34. It will be apparent that this arrangement not only locates the arms on opposite sides of the post 12, but also permits adjustment of each lamp about both ends of its arm. Each lamp is furthermore provided with a carrying handle 36 and the clamping levers 34 permit removal of the lamps from the stand whereby permitting use of the lamps independently of the stand.

The lamps are adapted to be operated by electric current secured from a motor vehicle battery and cable wiring is provided for this purpose. This wiring includes a main cable 38 having one end secured to the stand at 40 and branching therefrom into two cables 42 having their free ends received into the lamp sockets 44. The free end of the main cable 38 is provided with terminal contacts 46 for plugging into a corresponding socket such as the socket 48 on the motor vehicle. It will be noted that this connection is of the polarized type whereby preventing grounding of the circuit by contact of the lamp with the body of the vehicle.

The primary purpose of our equipment is to flood-light a vehicle wreck or other scene of accident or emergency and at the same time provide a warning signal to oncoming traffic. To this end we adapt the lamp 15 to produce floodlighting and the lamp 16 to effect a warning. Effective floodlighting necessarily requires the use of a substantial flow of electrical energy and since our equipment depends upon a battery of relatively low voltage for this energy, such as the six and twelve volt batteries used on motor vehicles, we so form the cable wiring that the full capacity of the battery is delivered to the lamps. To this end the cable is constructed of relatively large conductors 50 and each of these conductors is preferably formed of a large number of relatively fine wires whereby rendering the cable strong and flexible. It will be understood that two of the stranded conductors 50 are used in parallel for the lead wire and the other two are used in parallel for the return wire, thus increasing the capacity without substantially increasing the cost or weight of the cable. The cable also incorporates fibre cords 52 and is completed by a substantial covering of rubber 54.

The lamp 15 is provided with a two way switch 56 for turning the lamp on and off and is also provided with adjustable focus means. For the lamp 16 we preferably use a clear lens on the rear face of which is placed a red gelatine film. This film is very thin and absorbs considerably less light than does a colored lens. The light produced is thereby of higher intensity and better serves its warning function than would be the case were a colored lens used. This lamp is furthermore preferably constructed to give either a steady light or a flashing light and a three way switch 58 is provided for controlling these functions.

As stated above, either or both lamps may be removed from the stand and used independently merely by releasing the hand levers 34. To permit such use, particularly of the floodlighting lamp 15, we provide an extra length 60 of cable. This cable 60 can be placed in the lighting circuit of the lamp 15, as indicated in Fig. 7, and thereby permit use of this lamp at points remote from the stand. Furthermore, the lamp 15 and cable connection thereto are preferably made watertight whereby permitting use of the lamp under water for such purpose as locating drowned bodies. The extra cable 60 as well as extra lamp bulbs 62 are conveniently packed within the carrying case 10.

The practical application and utility of our invention in the field of motor vehicle traffic and the like is believed to be obvious. When an accident or emergency occurs at night those in attendance are at great disadvantage due to lack of proper lighting facilities. One object of our invention is to provide a lighting equipment which can be conveniently carried and operated from each police cruising car, each truck fleet car, or any other car or vehicle so equipped, and which equipment will be so inexpensive and so convenient to handle that wide distribution thereof may be obtained, it being understood that such wide distribution of the equipment is essential to properly serve the large number of accidents which are continually occurring under present traffic conditions. The cumbersome nature of emergency lighting equipment heretofore known, as well as the considerable investment involved, has precluded the wide distribution of such equipment for emergency uses. In contrast thereto, our novel lighting equipment is of light weight and small volume and its cost so moderate that many such units can be purchased for the cost of one of the expensive units heretofore used.

Considering, for example, the use of our invention in police cruising cars, each such car 70 will carry the equipment illustrated in Fig. 6 and will furthermore be equipped with a socket 48 to its battery. When an emergency, such as a wreck 72, is encountered, the equipment will be removed from its case 10 and set up as in Figs. 3 and 4 and placed as, for example, in the position illustrated in Fig. 1. In such position the lamp 15 illuminates the wreck while the lamp 16 warns oncoming traffic and directs it around the wreck. It will be understood that the engine in the car 70 may be kept running whereby to prevent its battery from being exhausted. The floodlight thus produced is the equivalent of that produced by the 110 volt current heretofore generated by expensive and cumbersome equipment. Furthermore, the lamp 15 may be removed from the stand and through use of the extra cable 60 employed at points remote from the stand.

Fleets of motor vans, busses and the like are continuously in operation on the roads and these vans, especially when running on long trips, operate more particularly at night. It frequently becomes necessary to make temporary repairs or change tires on the road and this operation is attended with grave danger from oncoming traffic, cases of death and injury under such circumstances being rather common. The application of our invention to the end of eliminating this danger is illustrated in Fig. 2 wherein, before beginning the job, the operator places our lighting equipment to the rear of the van 74 and in such position that the lamp 15 floodlights the job while the lamp 16 protects the operator from oncoming traffic. The useful application of the invention to the end of serving these two most necessary and useful functions is believed to be so apparent as to need no further description or comment. It will of course be understood that such repairs must be made with the truck remaining on the road since to drive these heavily loaded vans off the road for this purpose would be dangerous and would also be attended with the possibility of bogging the vans.

It will be understood that the emergency lighting kit of our invention can be constructed in various forms and used in any emergency, and that the forms and use herein illustrated and described are disclosed as examples only, the scope of the invention being determined by the claims appended hereto.

Having thus described our invention what we claim as new and desire to secure by Letters Patent is:

1. An emergency lighting kit for use with a motor vehicle battery, comprising a supporting stand, two electric lamps, means mounting the lamps in oppositely disposed directions on the stand and including means for adjusting one of the lamps independently of the other whereby to direct the same to different positions, the stand together with said means and lamps being collapsible to compact form permitting packing of the kit into a carrying case, and cable wiring connected to the lamps and having a terminal adapted to plug into a battery socket on a vehicle.

2. An emergency lighting kit for use with a motor vehicle battery, comprising a supporting stand, an electric flood lamp and an electric warning lamp, means mounting the lamps on the stand and adjustable to dispose the lamps in opposite directions, the stand together with said means and lamps being collapsible to compact form permitting packing of the kit into a carrying case, and cable wiring of relatively large current carrying capacity connected to the lamps and having a terminal adapted to plug into a battery socket on a vehicle, the set-up kit being adapted to be so disposed in traffic that the flood lamp shines in one direction to illuminate a wrecked vehicle while the warning lamp shines in another direction to signal oncoming traffic.

3. An emergency lighting kit for use with a motor vehicle battery, comprising a stand having a centrally disposed support, two L-shaped arms mounted on the support and extending respectively in opposite directions to opposite sides of the support, two electric lamps respectively carried by said arms, the stand being collapsible to a position wherein said arms and lamps are disposed adjacent to and along opposite sides of the support and wherein the kit may be packed into a compact carrying case, and cable wiring carried by the stand for delivering electric current to the lamps, the wiring being provided with a terminal adapted to plug into a battery socket on a vehicle.

4. An emergency lighting kit, comprising a carrying case, a stand having base supporting means for supporting the stand in upright position on the ground, arms and two electric lamps all collapsed to small capacity and packed within the case, said means being adapted to be brought to stand supporting position and said arms being jointed and independently adjustable to support the lamps in differently directed positions, and cable wiring carrying a terminal for plugging into a battery socket on a vehicle whereby to deliver electric current to the lamps.

5. An emergency lighting kit, comprising a carrying case, a stand having a supporting post carrying two L-shaped arms and two electric lamps carried by the arms and all collapsed to small capacity and packed within the case, each arm and its lamp being disposed opposite to the other arm and its lamp with the post therebetween, the stand being adapted to be brought to and supported in vertical position with the arms supporting the two lamps in oppositely disposed directions, and cable wiring carrying a terminal for plugging into a battery socket on a vehicle whereby to deliver electric current to the lamps.

6. An emergency lighting kit, comprising a carrying case, a stand having base supporting means, arms and two electric lamps all collapsed to small capacity and packed within the case, said means being adapted to be brought to stand supporting position and said arms being jointed and adjustable to support the lamps in oppositely disposed directions, cable wiring carrying a terminal for plugging into a battery socket on a vehicle whereby to deliver electric current to the lamps, one of said lamps being readily removable from its supporting element, and an extra length of cable packed within the case and adapted to be placed in the lighting circuit of said lamp whereby to permit use of the lamp at points remote from the stand.

ALFRED MACK.
MARY W. MACK.